UNITED STATES PATENT OFFICE.

ORAZIO LUGO, OF BALTIMORE, MARYLAND.

IMPROVEMENT IN MANUFACTURE OF FERTILIZERS FROM FISH, &c.

Specification forming part of Letters Patent No. 104,327, dated June 14, 1870.

Be it known that I, ORAZIO LUGO, of the city and county of Baltimore, State of Maryland, have invented certain Improvements in Treating and Utilizing the Liquor and Scraps or Pomace obtained from Fish in the process of extracting the oil, of which the following is a specification:

The first part of my invention relates to the treatment of the liquors obtained with the oil in the steaming, boiling, and pressing of fish, with chemical agents to retard the formation of ammoniacal compounds, and to fix and retain any such which may be formed during the concentration of said liquors. I use sulphuric acid, either alone or in combination with the salt cake of commerce, as an acid sulphate. Hydrochloric acid, and also pyroligneous acid, may be used when they can be obtained at a low cost.

The second part of my invention relates to the concentration of the above-mentioned liquors or extract from fish. This I effect by passing currents of air or other gases through the heated liquor.

The third part of my invention relates to the mixing or addition of the liquors treated chemically, as described, either with or without concentration, to the pressed scraps or pomace, when, if desired, the whole may be desiccated.

The fourth part of my invention relates to the treatment of the pressed scraps or pomace of fish with the above-described chemical agents, to serve substantially the same purpose during the subsequent drying, whether this be effected slowly, at ordinary temperatures, or by artificial means.

The operation is as follows: In the process usually employed for the extraction of oil, the fish are boiled or steamed and pressed. From the surface of the aqueous and highly-nitrogenous extract thus obtained the oil is removed, and the extract or liquor treated as a waste product, or, at best, but imperfectly utilized, owing to the rapidity with which it undergoes decomposition. I collect this liquor or extract in suitable vats or tanks, where it is treated with a sufficient quantity of either sulphuric acid, acid sulphates, hydrochloric acid, pyroligenous acid, or a combination of any of them, to retard putrefaction, and to fix and retain the nitrogenous matter during the subsequent concentration. The quantity of the chemical agents required will necessarily depend upon the strength of the liquors. After such chemical treatment, the liquor is concentrated by applying heat. This operation will be materially hastened by passing currents of air or other gases through the liquors or extract. This concentration may be carried to such a point as to obtain a dry extract, or it may be stopped at any desired point, and the product added to any other suitable basis for a fertilizer—such as fish pomace or scraps, phosphatic rocks, bones, loams, &c.

The escape of ammoniacal gases from the pressed fish pomace or scraps during drying may be prevented by adding a small quantity of any of the above-mentioned chemical agents.

Having thus described my process, what I claim as my invention, and desire to secure by Letters Patent of the United States, is—

1. The treatment and utilization of the fish liquor or extract herein mentioned with the above-described chemical agents, substantially in the manner and for the purpose described.

2. The concentration of the said liquors by the application of heat, either with or without the use of currents of air or other gases or in vacuum, in the manner and for the purpose described.

3. The mixing or addition of the fish extract or liquor, when treated with the above-described chemical agents, either with or without concentration, with the fish-scraps, phosphatic materials, bones, loam, or other suitable basis for a fertilizer.

4. The treatment of fish scraps or pomace, previous to desiccation, with the above-described chemical agents, for the purpose set forth.

5. As a new article of manufacture, the highly-nitrogenized product made by evaporating to dryness the fish-liquors, when chemically treated, as above described.

ORAZIO LUGO.

Witnesses:
 W. TOWNSEND,
 EDM. F. BROWN.